United States Patent [19]
Knapp

[11] Patent Number: 5,613,521
[45] Date of Patent: Mar. 25, 1997

[54] MIXING VALVE HAVING A BALL VALVE CARTRIDGE AND A LOWER INSERT MEMBER

[75] Inventor: Alfons Knapp, Biberach/Riss, Germany

[73] Assignee: Masco Corporation, Taylor, Mich.

[21] Appl. No.: 343,530

[22] PCT Filed: Oct. 7, 1994

[86] PCT No.: PCT/US94/11222

§ 371 Date: Nov. 21, 1994

§ 102(e) Date: Nov. 21, 1994

[87] PCT Pub. No.: WO95/10724

PCT Pub. Date: Apr. 20, 1995

[30] Foreign Application Priority Data

Oct. 8, 1993 [IT] Italy .................... TO93A0733

[51] Int. Cl.$^6$ ............................... F16K 11/076
[52] U.S. Cl. ................... 137/625.41; 137/454.6; 137/636.3
[58] Field of Search ............ 137/625.41, 625.17, 137/636.3, 454.6

[56] References Cited

U.S. PATENT DOCUMENTS

| | | | |
|---|---|---|---|
| 2,592,062 | 4/1952 | Perry | 137/625.41 |
| 3,915,195 | 10/1975 | Manoogian | 137/625.41 |
| 4,043,359 | 8/1977 | Christo | 137/625.41 |
| 4,200,123 | 4/1980 | Brandelli | 137/625.4 |
| 4,352,369 | 10/1982 | Lorch | 137/625.41 X |
| 4,449,551 | 5/1984 | Lorch | 137/625.41 |
| 5,018,553 | 5/1991 | Grassberger et al. | 137/625.41 |
| 5,040,566 | 8/1991 | Orlandi | 137/625.41 |

FOREIGN PATENT DOCUMENTS 9222765 12/1992 WIPO.
9318325 9/1993 WIPO.

*Primary Examiner*—John Rivell
*Attorney, Agent, or Firm*—Reising, Ethington, Barnard & Perry

[57] ABSTRACT

A mixer valve includes a cartridge (26) that houses a ball valve element (24) that has its lower end exposed to cooperate with elastomeric seals (49) seated in inlet ports (45,46). The ball valve element (24) is vertically affixed within the cartridge housing (56) by a pin (60). The elastomeric seals (49) and ports (45,46) are in an installable insert member (44) which cooperates with inlet passages (18,19) in the lower base member (14). The cartridge (26) is removable from the insert member to expose the elastomeric seals (49) for replacement thereof.

6 Claims, 4 Drawing Sheets

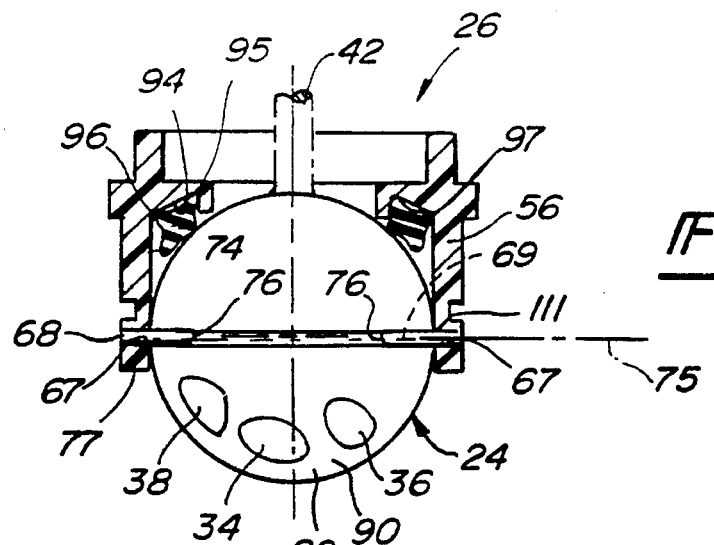
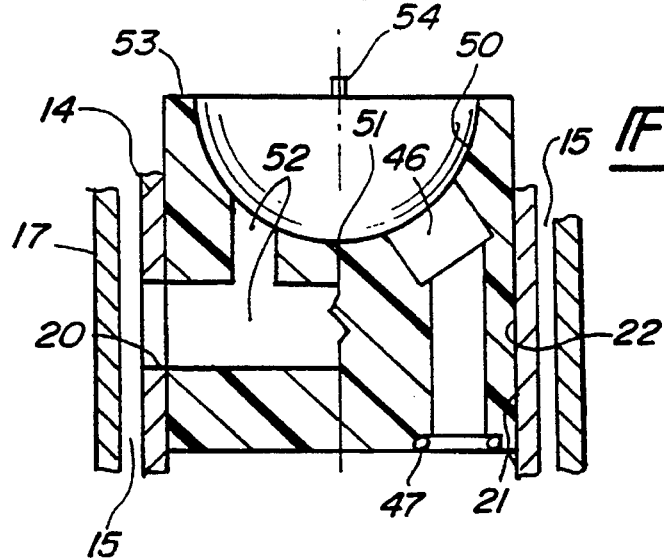
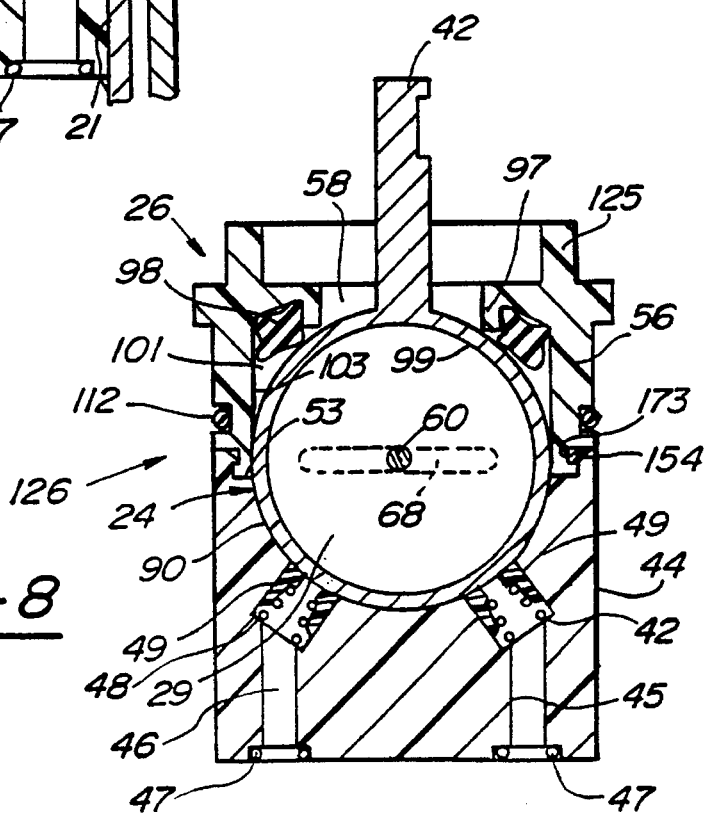

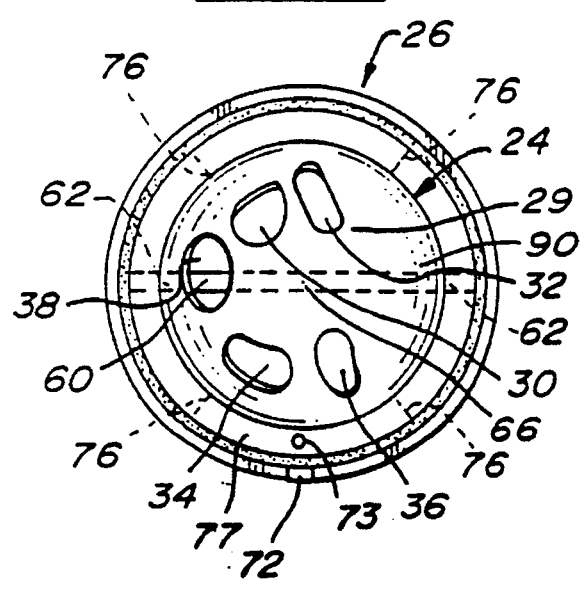
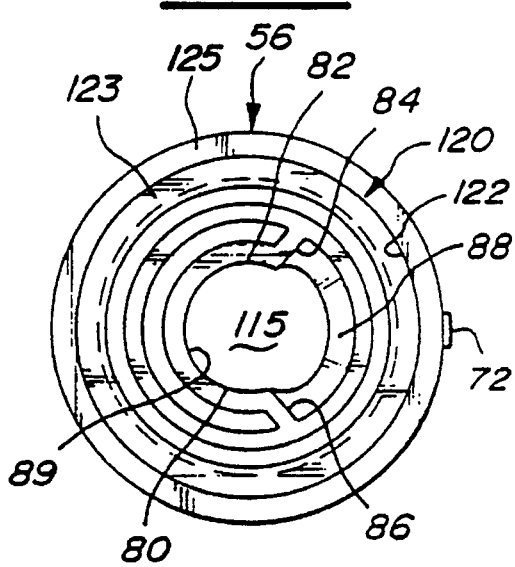
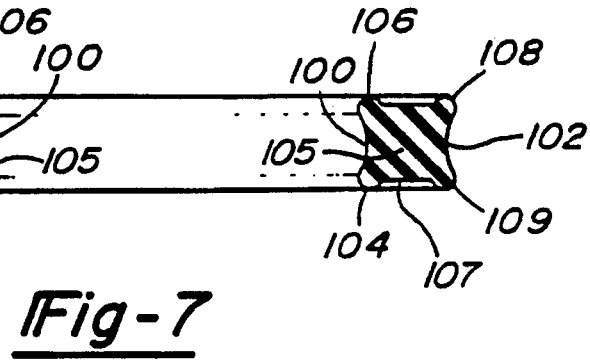

MIXING VALVE HAVING A BALL VALVE CARTRIDGE AND A LOWER INSERT MEMBER

TECHNICAL FIELD

The field of this invention relates to a mixer valve for a faucet incorporating a movable valve element housed in a cartridge and more particularly to a ball valve element housed in a cartridge.

BACKGROUND OF THE DISCLOSE

Single handle faucets, commonly referred to as mixer valves, that control both hot and cold water flow have seen vast consumer acceptance. These faucets are commonly constructed such that a handle or knob is movable in two distinct directions to adjust the mix of hot and cold water and to adjust the volume or flow rate.

The two basic types of mixer valves that have seen widest commercial acceptance are plate valves and ball valves. While ball valves offer a reliable compact construction that is durable, plate valves offer a drive mechanism that allows motion to the handle in two desirable directions most universally accepted by consumers. The desirable handle motion allows for an orbiting motion of the handle about a fixed longitudinal axis of the valve body and a rocking, i.e. pivoting, motion about a movable horizontal axis relative to the valve body. The horizontal axis is perpendicular to the longitudinal axis of the valve body and is fixed with respect to the handle such that it moves about the housing as the handle rotates about the fixed longitudinal axis. The one distinguishing characteristic of this type of handle motion is that when the handle is pivoted to an off position, the desired mix ratio of hot and cold water can be remembered by the location of the handle so that when the faucet is turned back on, the same mix of hot and cold water flows through the faucet.

Recently, ball valves have been devised that allow the handle to be operated in the same fashion as the commercially accepted plate type mixer valve. Some of these ball type mixer valves require the introduction of another moving part in the form of a rotatable plate mounted above the ball valve element. Furthermore, these ball valves have been combined with plate devices which can be adjustably positioned about a cover opening through which the handle controls the ball valve to limit the total flow rate. Alternately or in addition, these limiting devices limit the maximum ratio of hot water to cold water and consequentially the maximum temperature of the mixed water at the outlet.

Various disadvantages exist with the above mentioned ball valve construction. In particular, the ball valve element is mounted between elastomeric inlet port seals positioned about the inlet ports of the valve body and a sealing gasket that is mounted under the valve cover or gap. The elastomeric port seals and gasket are all yielding and render a floating characteristic to the ball valve element between the valve body and cap. There is no positive lock or locator mechanism that securely positions the ball valve in place. Because the ball valve can be moved in a translational manner against the elastomeric elements, the operator when operating the handle can also move the handle a small amount in any direction including directions not contemplated in the design of the mixing valve. This unwanted motion renders a undesirable spongy feel to the operation of the faucet and an uncertainty to the operator as to the proper operation of the faucet. Furthermore, the spongy feel of the handle gives the impression that the handle is unstable and not assembled properly.

The top sealing gasket provides three functions. Firstly, it seals against leakage of water about the ball. Secondly, its outer periphery seals against the inner surface of the housing to prevent leakage. Thirdly, the gasket resiliently positions the ball downwardly against the inlet seals. As a consequence, the gasket is an expensive component due to its mass and shape. To obtain a smooth operation, the elastomeric sealing gasket has a thin layer of tetraflouroethylene that contacts the ball valve to reduce wear as compared to direct contact of the elastomeric material with the ball member.

In order to reduce the floating feel, a regulation ring has been incorporated in many ball valve mixing valves. The regulation ring is adjustably screwed onto the valve cap. The regulation ring pushes the sealing gasket downward against the ball valve element which in turn is pressed against the inlet seals. The downward placement of the sealing gasket and ball valve element reduces the undesirable motion but does not eliminate it. Furthermore, the combining of the regulation ring with the known gasket increases the cost and complexity of the mixing valve. The increased pressure exerted in the sealing gasket wears the gasket down. As wear and tear progresses, the regulation ring must be repeatedly adjusted to restore pressure on the gasket to both seal and provide the handle with an operating resistance that maintains it in a stable position against gravitational forces exerted on a faucet handle.

Another ball construction which mimics the desirable handle motion of known plate valves is disclosed in my PCT publication WO 92/22765 published on Dec. 23, 1992 which incorporates a horizontal pin extending through the ball valve to position the ball in the housing. This construction virtually eliminates the floating or spongy feeling during operation of the ball valve faucet.

Cartridges for the valve elements and seals have also been commercially popular. Known cartridges have housed the movable and fixed plate. The cartridge can easily be removed and replaced with another in order to effect an easy repair to the faucet. After the water supply is turned off, the faucet is merely opened and the cartridge is easily replaced. This type of repair can be accomplished without the need to call in skilled labor.

Plate valves have often been incorporated into a cartridge format. However, ball valves have not been amenable to a cartridge construction. Firstly, the floating nature of the traditional ball valve demanded that any cartridge completely surround and capture the ball valve, otherwise the ball valve simply falls out of the bottom of the cartridge. Secondly, the compact nature of the ball valve construction leaves little room for the inclusion of a cartridge. The introduction of traditional cartridges that house and capture the ball into the faucet housing demands that the housing be made taller to incorporate the added height needed for the inclusion of the cartridge.

Furthermore, traditional cartridges inhibit repair to worn elastomeric seals. The cartridge houses both the moving valve element and the fixed valve ports which often include the elastomeric port seals. Most of the wear and resulting leakage in a faucet is the result of the repetitive motion of the moving valve element on the elastomeric port seals. Because the seals are encased in the cartridge, the entire cartridge is replaced including the replacement of many good cartridges components that still have long useful life. The desire to eliminate waste however is offset by the need to simplify the repair operation. Furthermore, many cartridges are permanently assembled and do not permit dismantling.

Even for cartridges that can be dismantled, the advantages of a cartridge is lost if the cartridge was dismantled into all of its component parts. The movable valve element falls out and is often not replaced in its correct orientation. This mis-installation can easily occur for symmetrical plate valves and ball valves which are inherently symmetrical. It takes a knowledgeable and skilled person to avoid mounting certain ball valves in a cartridge in its incorrect orientation.

What is needed is a ball valve cartridge for a mixer valve that houses the upper sealing elements that seal against leakage to the exterior of the housing and seats a ball valve element but allows access to the elastomeric port seals about the inlet ports. What is also needed is a cartridge that seats the movable ball valve element and allows the ball valve to operationally engage a faucet insert that has two valve inlets therethrough that is seated in the faucet body. What is also needed is a ball valve cartridge assembly that can be opened to provide access to the elastomeric seals while retaining the ball valve in a mounted and installed condition with the cartridge.

SUMMARY OF THE DISCLOSURE

In accordance with one aspect of the invention, a mixer valve for liquids has a ball valve pivotably mounted in a valve receiving cavity of a housing. The cavity is in fluid communication with a plurality of inlet ports and at least one outlet port. The ball valve has at least a partially spherical surface and a plurality of inlet openings in its surface. The openings cooperate with the ports to control fluid flow through the ports. The valve housing has a control opening. The ball valve has a control stem passing through the control opening.

The ball valve is pivotably mounted to a cartridge housing. The mixer valve has a cavity which is sized to house the cartridge housing. The cartridge has a lower opening through which said ball valve element protrudes to be cooperative with the inlet ports such that the ball valve element directly abuts elastomeric inlet port seals housed at the downstream end of inlet ports.

In accordance with another aspect of the invention, a faucet mixer valve has a valve element movably mounted to a cartridge housing that is received in a cavity of a faucet body. The body has a plurality of inlet ports and an outlet port in fluid communication with the cavity. The movable valve element protrudes through a lower opening in the cartridge to be cooperative with the inlet ports. The movable valve element cooperates with the inlet ports to control liquid flow in both flow rate and temperature mix through the ports.

In accordance with another aspect of the invention, a faucet body includes a lower base member, a cover assembly and a valve seat insert received in the lower base member. The insert has the inlet ports passing therethrough and seats the elastomeric port seals at the downstream end. Preferably, the outlet port also passes through the insert. The insert preferably is made from moldable plastic. The insert is preferably equipped with a retention device that retains the insert seated in the faucet body.

In an alternate embodiment, the insert can be removably fastened to the cartridge such that a conventional looking cartridge assembly appearance is achieved. However, when the insert is removed, the integrity of the movable valve element being secured to the cartridge is maintained while providing access to the elastomeric port seals.

In this fashion, a valve element is incorporated into a valve cartridge without necessitating an increase in the overall height of the valve body. Furthermore, the seal that prevents leakage about the movable valve element and cartridge can have a minimal size and weight because the upper gasket seal no longer has the double function of biasing and positioning the movable valve element against the inlet port seals.

BRIEF DESCRIPTION OF THE DRAWINGS

Reference now is made to the accompanying drawings in which:

FIG. 3 is a partially cross-sectional view of the cartridge member taken along line 3—3 shown in FIG. 1;

FIG. 4 is a fragmentary cross-sectional view of the taken along line 4—4 shown in FIG. 2 further illustrating the insert member;

FIG. 5 is a bottom plan view of the cartridge shown in FIG. 2;

FIG. 6 is a top plan view of the cartridge housing shown in FIG. 2;

FIG. 7 is a cross-sectional view of the gasket shown in FIG. 1 in an unloaded condition; and FIG. 8 is a segmented view of an alternate embodiment illustrating a cartridge assembly including a modified insert attached to a modified cartridge.

DETAILED DESCRIPTION OF THE PREFERRED EMBODIMENT

Figure 1:
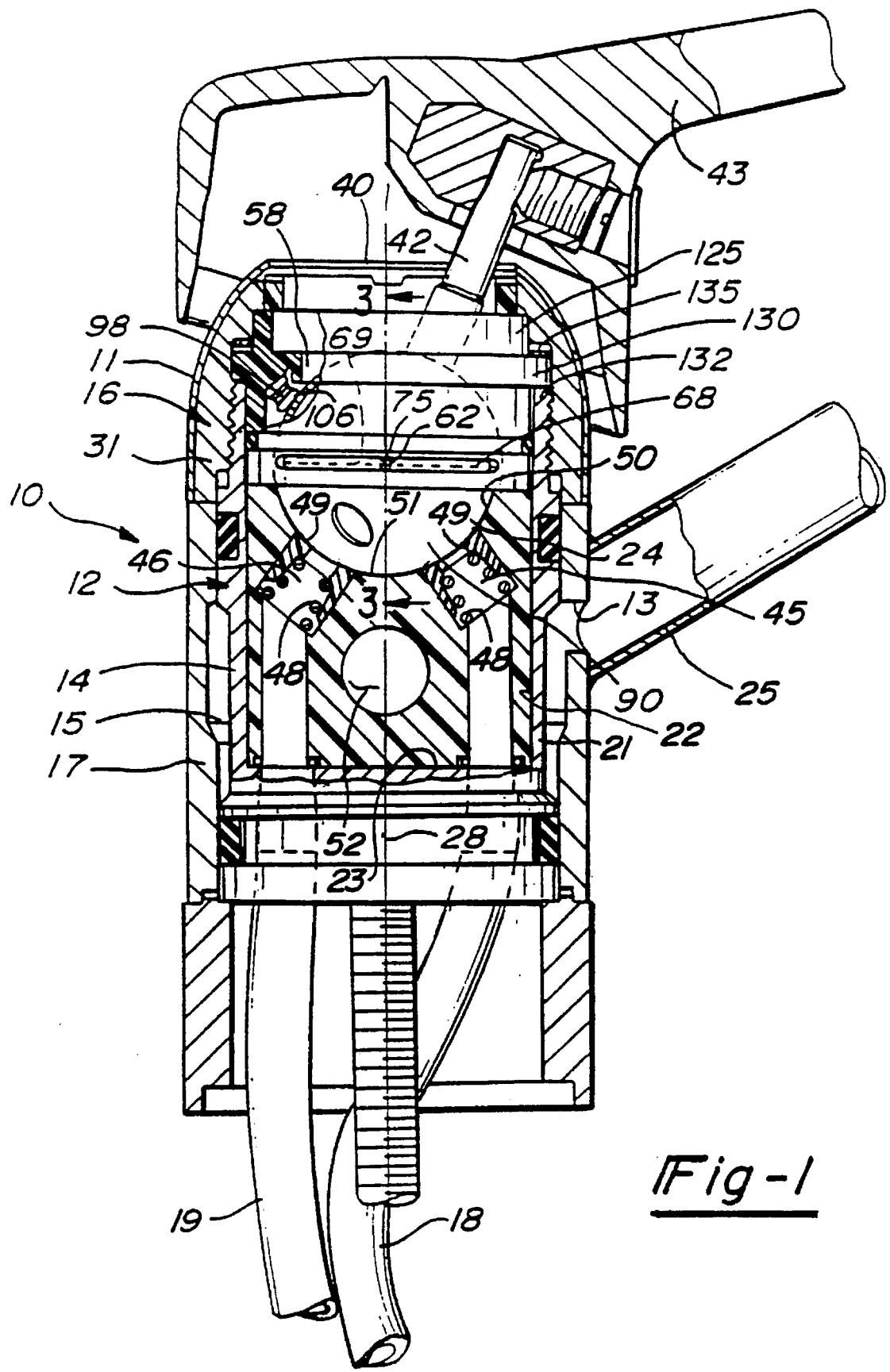
FIG. 1 is a side elevational and segmented view of a mixer valve illustrating one embodiment of the invention.
Figure 2:
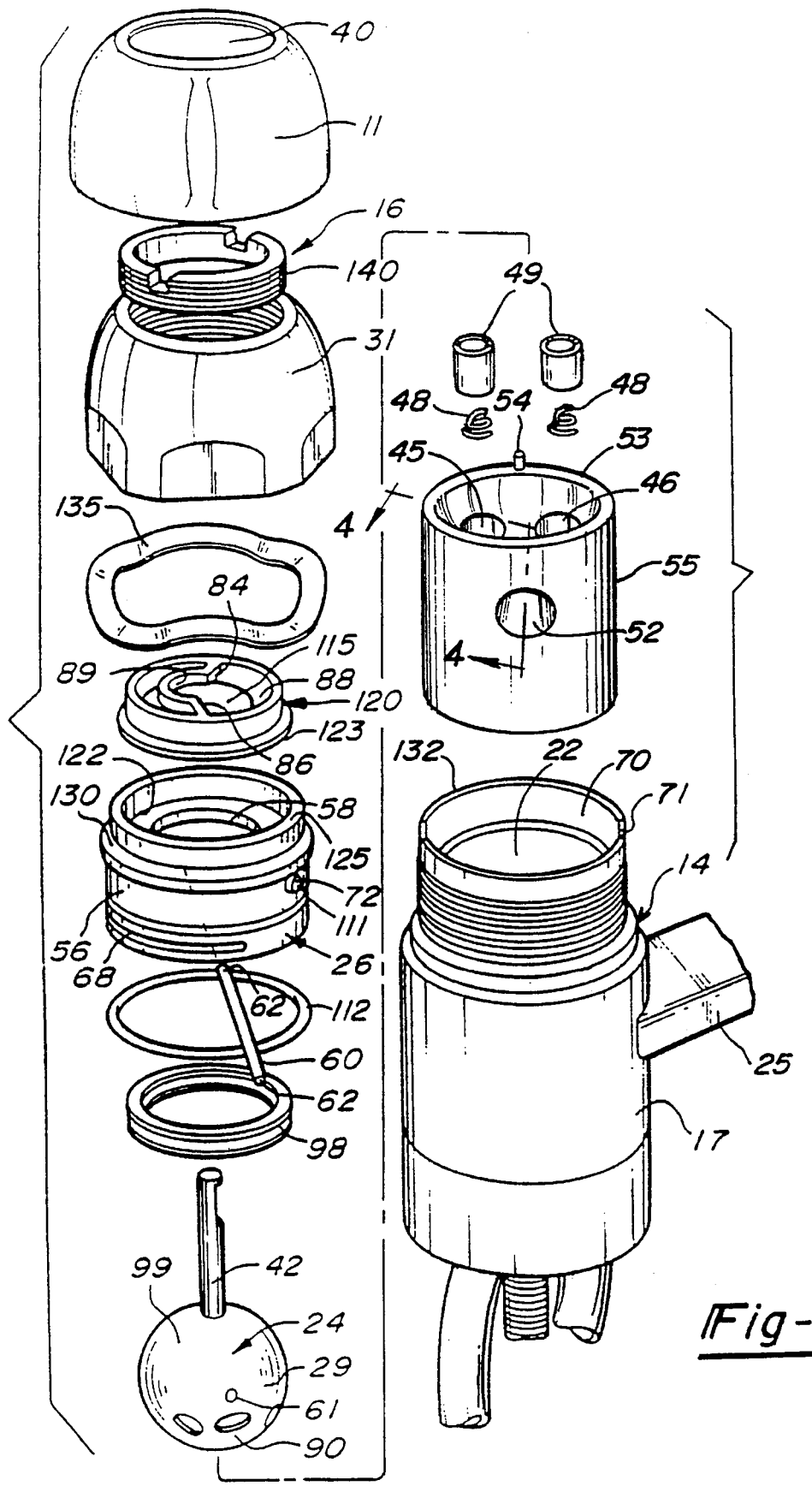
FIG. 2 is an exploded perspective view of the mixer valve shown in FIG. 1.

Referring to FIGS. 1, 2, and 4, a mixer valve 10 includes a valve housing 12 that is formed from a lower base member 14 and a cover assembly 16. The base member 14 has a substantially cylindrical cavity 22 formed therein with two inlet passages 18 and 19 at a flat bottom end 23 for cold and hot water and an outlet passage 20 through a side cylindrical wall 21 for the passage of mixed water from cavity 22.

A conventional tubular shell 17 is sealingly and slidably mounted about the lower base member 14 and forms an annular chamber 15 in fluid communication with the outlet passage 20. A spout 23 is affixed to the shell and in fluid communication with the annular chamber 15 through aperture 13 in shell 17. The cover assembly 16 includes a threaded member 31 that is screwed onto the base member 14. A cosmetic shell 11 is positioned over the member 31.

The lower base member 14 is fitted with an insert member 44. Insert member 44 has respective inlet ports 45 and 46 that are aligned with inlet passages 18 and 19. The upstream ends of inlet ports 45 and 46 are counter bored to receive o-rings 47 at the upstream end. O-rings 47 seal up against the end of passages 18 and 19 to provide a leak free connection between passage 18 and port 45 and between passage 19 and port 46. The downstream ends of ports 45 and 46 are counter-bored to form a seat for two biasing springs 48 which bias tubular elastomeric sealing elements 49 against the ball valve element 24. The holes therethrough have a diameter of approximately 6.5 mm. The ports 45 and 46 have their downstream ends positioned at approximately 40° up from the bottom point 51 of concavely formed semi-spherical cavity 50. Furthermore, the ports 45 and 46 are circumferentially positioned approximately 15° from the fore and aft plane as measured from the vertical axis 28.

The outlet port 52 extends downwardly from the semi-spherical recess 50 and through the side wall 55 of the insert to be alignable with passage 20 of the housing 17. Top wall 53 may have an upwardly extending lug or key 54.

The insert member 44 is made from easily molded plastic material. The molding of plastic insert 44 provides for an expeditious method to make the bent and inclined ports 45 and 46. Even if the insert 44 is made from metal, the easy accessibility of ports 45, 46, and 52 provide for greater design flexibility and ease of manufacturing the ports 45, 46, and 52 as compared to previous faucets when the ports 45, 46, and 52 are formed directly in lower base member 14.

The semi-spherical valve recess 50 is sized to receive a ball valve element 24 that is housed in a cartridge 26. The cover 16 affixes the cartridge 26 in the cavity 22. The base member 14 has an upright collar flange 70 with a keyed slot 71 that receives a key 72 of cartridge housing member 56 to correctly orient the cartridge 26 in the mixer valve 10. As shown in FIG. 5, the cartridge has a hole 73 in its bottom edge 77 to receive key 54 of insert member 44 such that insert member 44 is rotationally aligned in its correct position.

The ball valve element 24 has a substantially spherical valve surface 29 with cold inlet openings 30 and 32, hot inlet openings 34 and 36, and outlet opening 38 therethrough. The shape of the surface 29 substantially complements the concave contour of recess 50. The openings 30 and 32 cooperate with the cold inlet port 45, openings 34 and 36 cooperate with hot inlet port 46, and outlet opening 38 cooperates with outlet port 52 respectfully to regulate the mixture ratio of water and the flow rate, i.e. volume of total water per unit time from the two inlet ports 45 and 19 to the outlet port 52.

The cover assembly 16 has a control opening 40 therethrough. The cover 16 is positioned such that the longitudinal axis 28 of the valve housing 12 passes through the control opening 40. The cartridge housing member 56 has an upper opening 58 aligned under opening 40.

A control stem 42 is fixedly connected to the ball valve element 24. A control stem 42 extends through the control opening 40. The control stem 42 is constructed to be attached to a faucet handle 43 in a conventional fashion.

The ball valve element 24 is pivotably mounted to the cartridge housing member 56. The housing member 56 may be manufactured from known plastic material suitable for faucet applications. The ball valve element 24 also has a cylindrical pin 60 extending therethrough with its distal ends 62 extending to the exterior of ball valve surface 29. Holes 61 are sized to slidably receive the pin 60. The pin 60 is positioned to intersect the center 66 of ball valve 24 and lie perpendicular to control stem 42. The pin can be welded in place to ball valve element 24 as described in more detail later.

Each distal end 62 is positioned in a circumferentially disposed slot 68 formed in the cartridge housing 56. As shown in FIG. 3, each slot 68 has a central axis disposed in a plane 69 perpendicular to axis 28. Because the ends 62 are cylindrical in shape, they have a circular cross-section that allows them to pivot in slots 68 about an axis 75 that is perpendicular to axis 28.

The circumferential ends 74 of the slots 68 form stop shoulders 76 for the distal ends 62. The slots 68 are vertically dimensioned to form only enough clearance to allow sliding movement of the pin ends 62 in slot 68. Desirably no vertical spacing exists between slot 68 and the ends 62.

The ball valve element 24 has a lower section 90 of the spherical valving surface 29 protruding through the large lower open end 92 of the cartridge housing 56. The protruding section 90 is a significant portion of the ball. Approximately just under half of the spherical valving surface 29 protrudes under the cartridge lower opening 92 into cavity 50 of insert 44 as clearly shown in FIGS. 1, 3, and 8. The valving surface 29 with the openings 30, 32, 34, and 36 operably abuts the spring biased sealing elements 49 in insert 44.

The upper section 99 of ball element 24 is housed within the interior chamber 101 of cartridge housing 56 defined in part by interior depending cylindrical wall 103. The interior chamber 101 is a fluid communication with recess 50 of insert 44.

The annular gasket seat 94 is positioned about the upper opening 58 and faces ball element 24 within chamber 101. The gasket seat 94 is canted with its inner periphery 95 positioned higher than its outer periphery 96. A downwardly depending shoulder or collar 97 vertically depends at the inner periphery. An annular gasket seal ring 98 is mounted in the cartridge housing 56 against the seat 94 such that it is placed under a preload with its inner periphery 100 twisted to be higher than its outer periphery 102. The gasket seal ring 98 as shown in FIG. 7 has four rounded peripheral lip sections i.e. vertices 104, 106, 108, and 109. Each vertex 104, 106, 108 and 109 is circumferentially spaced approximately 90° from an adjacent vertex about central annular axis 105 of the gasket. Vertices 104 and 108 oppositely positioned at approximately 180° and vertices 106 and 109 are similarly 180° spaced apart. One of the vertices 104 positioned at a lower inner diameter position on the gasket abuts the ball valve element 24 and provides a seal therebetween against leakage of water. The respective upper inner and outer diameter positioned vertices 106 and 108 abut the canted seat 94 with inner diameter vertex 106 being positioned higher than outer diameter vertex 108 as shown in FIGS. 3 and 8. The gasket seal ring 98 is shown in FIG. 7 in the unloaded position with the vertices 106 and 108 being horizontally aligned. The upper section 99 of ball surface 29 that abuts gasket seal ring 98 is properly polished to the appropriate smoothness to provide a proper seal with the gasket.

The outer periphery 110 of the cartridge housing 56 has an annular groove 111 which seats an O-ring 112. The O-ring 112 is sized to seal the cartridge outer periphery 110 with the cavity 22 in lower base member 14 of housing 12. Rocking of the control stem along a plane containing the longitudinal axis 28 pivots the ball valve element 24 about the pivot axis 75 independently of the rotated position of the ball valve member about axis 28. Furthermore, the distal ends 62 may slide along slots 68 to allow the ball valve element 24 to rotate about axis 28 when the control stem 42 is swung about the longitudinal axis 28.

The rotation of the ball valve element 24 about axis 28 is lifted by the position of the stop shoulders 76 that abut the distal ends 68. Mixer valves having different applications may have different rotation angles established by the circumferential positioning of stop shoulders 76. The rotation of the ball valve element 24 as illustrated adjusts the ratio mix and thus the temperature of the discharged mixed water.

Alternately, or in addition to the stop shoulders 76, the rotation of the ball about axis 28 may also be limited by radially extending edges 80, 82, 84, and 86 of upper aperture 115 in guide template 120 that fits within upper recess 122 about aperture 58 in cartridge housing 56 as shown in FIG. 6. Recess 122 is surrounded by an annular retaining collar 125. The stem 43 when it abuts the edges 80–86 is prevented from further movement beyond the respective edges. Edges 80 and 82 define the cold limit and edges 84 and 86 define the hot limit. The edges 80–86 allow the ball to rotate about vertical axis 28 for approximately 90°.

The upper opening 58 also has circumferential edges 88 and 89 that control the extent of rocking motion about axis 75 of pin 60 from the off position to the full on position respectively.

The cartridge is assembled with the gaskets 98 and 112 properly seated. Ball valve element 24 is then positioned against gasket 98 and slightly pressed to bias the gasket 98. The pin 60 is then passed through the slots 68 and holes 61 in ball surface 29. The bias of the gasket 98 onto the ball 24 provides a frictional fit of the pin ends 62 onto the lower surface 67 of each slot 68 that prevents the pin 60 from falling out. Template 120 is then placed in recess 122. The template 120 has an outer then flange 123 that can be either press fitted or snap fitted in recess 122. It is also foreseen that the template 120 may be molded integrally with housing member 56. The assembled cartridge 26 is a self contained assembly that can be sold separately as a repair replacement for late reinstallation into the faucet mixer valve 10.

The assembled cartridge 26 is placed in cavity 22 of the faucet body 14. The slot 72 properly positions the cartridge 26 in the cavity and ledge 130 properly vertically positions the cartridge 26 on a corresponding ledge 132 in base member 14. Cover 16 is then threaded onto the upright flange 70 with a spring loaded corrugated ring 135 interposed between the cartridge 26 and cover 16 to downwardly bias the cartridge 26 against ledge 132.

The minimum clearance between ends 62 of pin 60 and slots 68 in the vertical direction prevents vertical displacement of the ball valve element 24 with respect to the valve housing 12 and cartridge housing 56. Consequently, the control stem does ot show any instability or render a spongy feel to the operator when the ball is pivoted along its two prescribed pivotable directions.

Insert member 44, once installed in lower base member 14 is normally not required to be removed. When repairs to or replacement of the elastomeric seals 49 are needed, the handle 43, covers assembly 16 are removed and cartridge 26 is axially lifted out of the lower base member to separate from insert 44 and to expose the seals 49. The seals 49 and springs 48 can then be removed and or replaced. After repairs or replacement, the cartridge 26, cover assembly 16 and handle 43 are then reinstalled.

Only those parts that are needed to be replaced, normally only the elastomeric seal 49, are in fact replaced while maintaining the advantages of ease of assembly and re-assembly of a cartridge faucet assembly. Insert member 44 may be optionally provided with noise abatement devices therein. Insert member 44 may also have ports 45 and 46 convoluted and arranged to reverse the hot and cold water supply when the hot and cold water pipes are in a reverse location. This often occurs when there is a so-called back to back installation for two adjacent shower stalls or baths.

In an alternate embodiment, as shown in FIG. 8, similar parts to parts described for the first embodiment have the same numerals. Insert member 44 is preattached to cartridge housing member 56 to form in appearance a complete cartridge assembly 126. Prongs 154 extend upward from top end 53 and removably snap fit into complementary shaped grooves 173 in cartridge housing 56, to both correctly orient the insert member 44 with housing member 56 and to maintain the assembled cartridge assembly 126. The entire cartridge assembly 126 may be preassembled and installed into cavity 22 of lower base member as one would install a conventional cartridge.

When repairs are needed, the entire cartridge assembly 126 is removed from the lower base member 14. The prongs 154 can flex to disengage to allow insert 44 to be axially removed from the cartridge 26 and to provide access to elastomeric seals 49 and springs 48.

However, unlike conventional cartridges, when insert member 44 is removed from cartridge assembly 126, cartridge 26 remains intact with the movable ball valve element 24 remaining operationally mounted therein and not falling out of the housing 56.

Once springs 48 and seals 49 are replaced, the insert member 44 can then again be snap fitted onto cartridge 26 to form cartridge assembly 126. Cartridge assembly 126 is then remounted in cavity 22. Cover assembly 16 and handle 43 are then reinstalled to complete the repair.

In this embodiment, cartridge assembly 126 and cartridge 26 may both be self contained assemblies that can be sold as replacement parts for later installation into the faucet mixer valve 10.

The need for a large resilient biasing regulation ring intended to push down the ball 24 against the spring biased sealing elements 25 is eliminated. Gasket seal ring 98 functions solely to prevent leakage between the ball valve element 24 and cartridge housing 56. The O-ring 112 functions solely to prevent leakage between the cartridge housing 56 and lower base member 14. The vertical position of the ball valve element 24 is affixed within the cartridge housing 56 by the pin 60 and slots 68. Furthermore, any adjustment ring 140 member that has previously been needed to provide proper bias of the ball valve 24 against seal elements 49 becomes optional.

Furthermore, the ball valve element 24 is incorporated into an easily replaceable valve cartridge 26 without necessitating an increase in the overall height of the valve housing 12 as compared to prior art mixing valves incorporating ball valve elements.

Furthermore, the ball valve element 24 is incorporated into an easily replaceable valve cartridge 26 without necessitating an increase in the overall height of the valve housing 12 as compared to prior art mixing valves incorporating ball valve elements.

Furthermore, the cartridge 26 is retrofittable or usable in the standard base 14 that has been previously been fitted with ball valves found in the prior art if the ball valve has the properly designed inlets and outlet. The cartridge 26 can also be used with a lower insert member 44 that simplifies the manufacture of lower base member 14. The cartridge 26 can accommodate preattachment to the insert member 44 to form an easily installed cartridge assembly 126.

Variations and modifications are possible without departing from the scope and spirit of the present invention as defined by the appended claims.

I claim:

1. In a faucet mixer valve having a movable valve element mounted in a housing body that defines a cavity, said body having a plurality of inlet ports and an outlet port in fluid communication with said cavity, said movable valve element cooperating with said inlet ports to control liquid flow in both flow rate and temperature mix through said ports, said valve body having a control opening therethrough, said valve element having a control stem connected thereto and extending through said control opening, the improvement characterized by:

said body including a lower base member having hot and cold supply passages and an outlet passage, said body having a substantially cylindrical cavity with a planar bottom;

said body including an insert member fitted in a lower section of said cavity of said lower base;

said insert member having respective inlet ports aligned for fluid communication with said hot and cold supply passages in said base member and having a respective outlet port in fluid communication with said outlet passage;

said insert member having a recess in its upper end for operably receiving said movable valve element to cooperate with said inlet ports;

said mixer valve being in cartridge form with a cartridge having a housing member;

said cartridge housing member having an upper opening for allowing said control stem passing therethrough;

means for seating said movable valve element to said cartridge housing member;

said cartridge having a lower opening through which said movable valve element protrudes into said recess in said insert member to be cooperative to said inlet ports;

said cartridge housing having a seal seat about said upper opening; and a sealing gasket seated in said seal seat about said upper opening in said cartridge housing and sealingly abuttable against said movable valve element.

2. A faucet mixer valve as defined in claim 1 further characterized by:

said inlet ports having seats which house tubular elastomeric seals that provides a seal with the movable valve element.

3. A faucet mixer valve as defined in claim 2 further characterized by:

said movable valve element being a ball valve;

said recess in said insert member being a semi spherical concave shape.

4. A faucet mixer valve as defined in claim 3 further characterized by:

said insert member and cartridge member being freely axial movable with respect to each other such that when said cover is removed and said cartridge is lifted from said cavity in lower base member, said insert remains in said cavity whereby said tubular elastomeric seals become exposed for replacement.

5. A faucet mixer valve as defined in claim 2 further characterized by:

said insert member and cartridge member being freely axial movable with respect to each other such that when said cover is removed and said cartridge is lifted from said cavity in lower base member, said insert remains in said cavity whereby said tubular elastomeric seals become exposed for replacement.

6. A faucet mixer valve as defined in claim 1 further characterized by:

said movable valve element being a ball valve;

said recess in said insert member being a semi spherical concave shape.

* * * * *

UNITED STATES PATENT AND TRADEMARK OFFICE
CERTIFICATE OF CORRECTION

PATENT NO. : 5,613,521
DATED : March 25, 1997
INVENTOR(S) : Alfons Knapp

It is certified that error appears in the above-indentified patent and that said Letters Patent is hereby corrected as shown below:

Column 1, line 55, delete "gap" and insert therefor --cap--.

Column 2, line 65, delete "cartridges" and insert therefor --cartridge--.

Column 5, line 33, delete "respectfully" and insert therefor --respectively--.

Column 7, line 40, delete "ot" and insert therefor --not--.

UNITED STATES PATENT AND TRADEMARK OFFICE
CERTIFICATE OF CORRECTION

PATENT NO.   : 5,613,521

DATED        : March 25, 1997

INVENTOR(S)  : Alfons Knapp

It is certified that error appears in the above-indentified patent and that said Letters Patent is hereby corrected as shown below:

In The Drawings:

Figures 1, 2, and 4, insert member ---44---.

Figure 2, add ---74--- and ---76---.

Figure 3, add ---60---, ---74--- to ends of slots and ---76---.

Signed and Sealed this

Twenty-eighth Day of October, 1997

Attest:

BRUCE LEHMAN

Attesting Officer

Commissioner of Patents and Trademarks